US010366227B2

(12) United States Patent
Bacher et al.

(10) Patent No.: US 10,366,227 B2
(45) Date of Patent: Jul. 30, 2019

(54) SECURE DEBUGGING IN A TRUSTABLE COMPUTING ENVIRONMENT

(71) Applicant: INTERNATIONAL BUSINESS MACHINES CORPORATION, Armonk, NY (US)

(72) Inventors: Utz Bacher, Dettenhausen (DE); Reinhard T. Buendgen, Tuebingen (DE); Heiko Carstens, Boeblingen (DE); Dominik Dingel, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 15/352,063

(22) Filed: Nov. 15, 2016

(65) Prior Publication Data
US 2018/0137273 A1    May 17, 2018

(51) Int. Cl.
G06F 21/53 (2013.01)
G06F 11/36 (2006.01)
(Continued)

(52) U.S. Cl.
CPC .......... G06F 21/53 (2013.01); G06F 9/45558 (2013.01); G06F 11/3664 (2013.01);
(Continued)

(58) Field of Classification Search
CPC ...... G06F 21/57; G06F 21/53; G06F 11/3664; G06F 2009/45587; G06F 2009/45591;
(Continued)

(56) References Cited

U.S. PATENT DOCUMENTS 6,424,718 B1 * 7/2002 Holloway ............. G06F 21/606
                                                    380/277
7,350,194 B1 * 3/2008 Alpern .................. G06F 11/362
                                                    714/E11.207
(Continued)

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.
(Continued)

Primary Examiner — Farid Homayounmehr
Assistant Examiner — Sanchit K Sarker
(74) Attorney, Agent, or Firm — Margaret McNamara, Esq.; Kevin P. Radigan, Esq.; Heslin Rothenberg Farley & Mesiti P.C.

(57) ABSTRACT

A trusted component commences a debugging session, based on determining that debugging of a virtual machine is to be initiated. The commencing of the debugging session includes generating encryption information to be provided to a client for which debugging is to be performed. The encryption information includes a key that is encrypted and to be used to encrypt a debug request to debug the virtual machine. The trusted component obtains an encrypted debug request indicating one or more operations to be performed to debug the virtual machine. The one or more operations are performed by the trusted component to obtain debugging results for the virtual machine.

16 Claims, 10 Drawing Sheets

(51) Int. Cl.
*G06F 9/455* (2018.01)
*G06F 21/57* (2013.01)
*H04L 9/06* (2006.01)
*H04L 9/32* (2006.01)

(52) U.S. Cl.
CPC ............ *G06F 21/57* (2013.01); *H04L 9/0656* (2013.01); *H04L 9/3271* (2013.01); *G06F 2009/45587* (2013.01); *G06F 2009/45591* (2013.01)

(58) Field of Classification Search
CPC .. G06F 9/45558; H04L 9/3271; H04L 9/0656
USPC ........................................................ 713/189
See application file for complete search history.

(56) References Cited

U.S. PATENT DOCUMENTS

| | | | | |
|---|---|---|---|---|
| 8,909,928 | B2* | 12/2014 | Ahmad | G06F 21/57 713/168 |
| 9,224,012 | B2* | 12/2015 | Wu | G06F 21/74 |
| 2007/0130345 | A1* | 6/2007 | Da Palma | H04L 69/40 709/227 |
| 2009/0119513 | A1* | 5/2009 | Chung | G06F 11/362 713/187 |
| 2011/0225459 | A1* | 9/2011 | Fahrig | G06F 11/366 714/37 |
| 2012/0260250 | A1* | 10/2012 | Maeda | G06F 21/53 718/1 |
| 2012/0324090 | A1* | 12/2012 | Gu | H04L 67/104 709/223 |
| 2014/0089667 | A1* | 3/2014 | Arthur, Jr. | G06F 21/57 713/171 |
| 2014/0173759 | A1* | 6/2014 | Essary | G06F 21/10 726/30 |
| 2015/0341341 | A1* | 11/2015 | Messerges | H04L 9/3297 713/151 |
| 2016/0085992 | A1* | 3/2016 | Boivie | G06F 11/362 726/27 |
| 2016/0246620 | A1* | 8/2016 | Wang | G06F 9/44521 |
| 2016/0378637 | A1* | 12/2016 | Gamble | G06F 11/362 707/702 |
| 2017/0124564 | A1* | 5/2017 | Pi Farias | G06Q 20/203 |
| 2018/0137273 | A1* | 5/2018 | Bacher | G06F 21/57 |
| 2018/0157562 | A1* | 6/2018 | Li | G06F 9/45533 |

OTHER PUBLICATIONS

IBM, "z/Architecture—Principles of Operation," Publication No. SA22-7832-10, 11th Edition, Mar. 2015, pp. 1-1732.
"Power ISA™ Version 2.07B," International Business Machines Corporation, Apr. 9, 2015, pp. 1-1527.
Bacher, Utz et al., "Restricting Guest Instances in a Shared Environment," U.S. Appl. No. 15/211,277, filed Jul. 15, 2016, pp. 1-46.

* cited by examiner

US 10,366,227 B2

SECURE DEBUGGING IN A TRUSTABLE COMPUTING ENVIRONMENT

BACKGROUND

One or more aspects relate, in general, to trustable computing environments, and in particular, to debugging within such environments.

Most information technology (IT) infrastructures place a great deal of trust in their operator staff to not only ensure a level of service and availability, but also to not disclose company related data or programs. This is also one of the biggest obstacles companies face when moving their infrastructure to a public or hybrid cloud environment. In such a case, the company not only needs to trust their own employees but also the employees of the cloud provider. This might also be critical in a sense of jurisdiction, as the cloud provider might be forced to open data of the customer to state agencies.

To address this, advances have been made to prevent operators from being able to copy the data and programs, to intercept or observe the inner workings of programs, or to modify the running programs. This is accomplished by allowing the customer to upload some encrypted application or virtual machine which is in no way accessible to the operator. Thus, an operator or other, whether or not malicious, is not able to directly observe the customers' memory or program. However, the program, as well as the operating system running within that virtual machine, might still contain errors in respect to execution, leading to unexpected and unwanted behavior of the service provided by the appliance. In such a situation, the customer is restricted in respect to the tools available to understand the problem.

SUMMARY

Shortcomings of the prior art are overcome and additional advantages are provided through the provision of a computer program product for facilitating debugging within a computing environment. The computer program product includes a storage medium readable by a processing circuit and storing instructions for execution by the processing circuit for performing a method. The method includes determining, by a trusted component of the computing environment, that debugging of a virtual machine of the computing environment is to be initiated; commencing, by the trusted component, a debugging session, based on determining that debugging of the virtual machine is to be initiated, the commencing the debugging session including generating encryption information to be provided to a client for which debugging of the virtual machine is to be performed, the encryption information including a key that is encrypted and to be used to encrypt a debug request to debug the virtual machine; obtaining, by the trusted component, an encrypted debug request indicating one or more operations to be performed to debug the virtual machine, the encrypted debug request encrypted using the key; and performing, by the trusted component, the one or more operations specified in the encrypted debug request to obtain debugging results for the virtual machine.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a secure debug facility is provided that enables debugging operations to be performed on a secure guest (also referred to as a guest virtual machine, a virtual machine or a virtual server) even when the guest is in production mode. Applications running on the guest, as well as operating system internals, may be debugged securely while the guest is executing in production mode (as opposed to a test mode or other special non-production mode).

Figure 1:
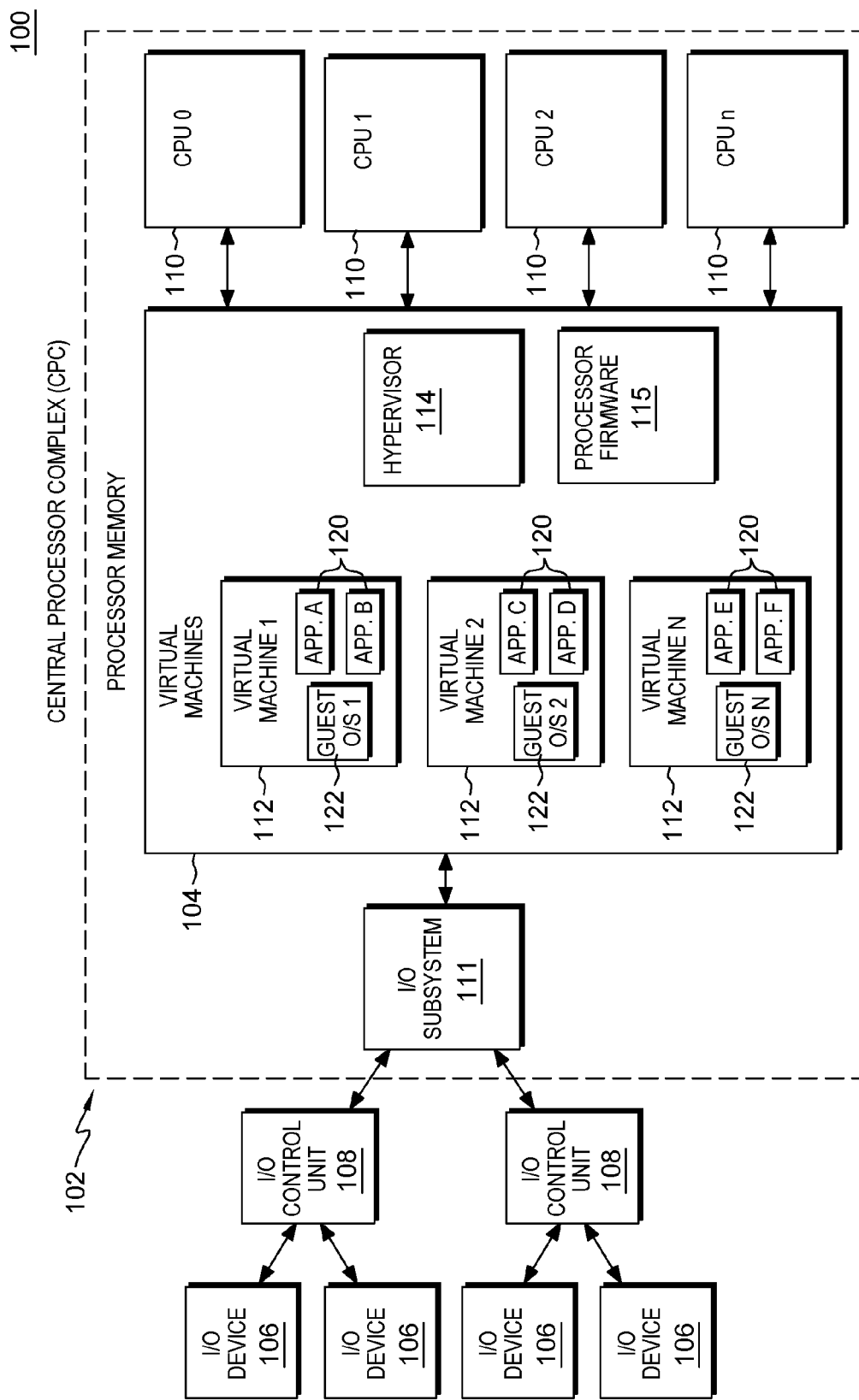
FIG. 1 depicts one example of a computing environment to incorporate and use one or more aspects of the present invention.

One example of a computing environment to incorporate and use one or more aspects of a secure debug facility is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11$^{th}$ Edition, March 2015, which is hereby incorporated by reference herein in its entirety. Z/ARCHITECTURE, IBM, and Z/VM (referenced herein) are registered trademarks of International Business Machines Corporation, Armonk, N.Y. Other names used herein may be registered trademarks, trademarks or product names of International Business Machines Corporation or other companies.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs) or processors) 110, and an input/output subsystem 111, each of which is described below.

Processor memory 104 includes, for example, one or more virtual machines 112, a virtual machine manager, such as a hypervisor 114, that manages the virtual machines, and processor firmware 115. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In one aspect, the computing environment is a secure or trustable environment that allows execution of the virtual machines while protecting content of the virtual machines from the hypervisor. That is, the hypervisor does not have access to any guest data or context. Instead, a trusted component is used to provide to the hypervisor what is needed to run the guests without providing guest data. This is used, for instance, to provide privacy in public compute environments, such as cloud computing environments, as well as other shared environments.

Figure 2:
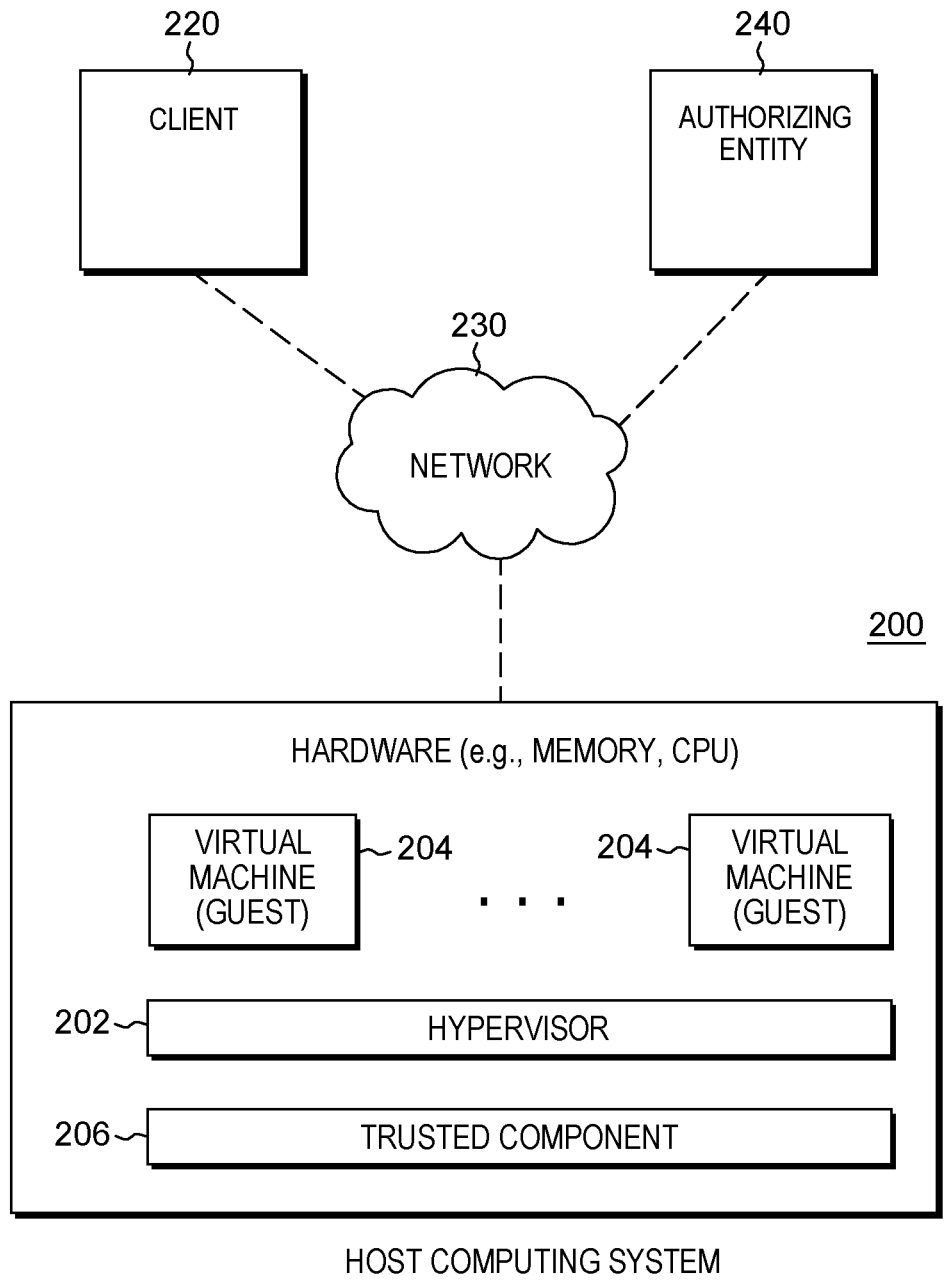
FIG. 2 depicts one example of a host computing system having a trusted component used in accordance with an aspect of the present invention.

Further details relating to a trusted component are described with reference to FIG. 2. As shown in FIG. 2, a host computing system 200 includes, for instance, a hypervisor 202 (e.g., z/VM or another hypervisor) that manages one or more virtual machines 204 via a trusted component 206. Hypervisor 202 is a mediator between a client system 220 (also referred to as a client) that requests creation of a virtual machine (and therefore is referred to as the owner of that virtual machine) and trusted component 206, which prevents the hypervisor from accessing data or context of the virtual machine.

Trusted component 206 may include firmware, hardware and/or software. It communicates with client 220 via hypervisor 202 using encrypted information. It prevents the hypervisor from accessing data or context of the virtual machine. It is considered trusted because it is not changeable by a third party. In one example, it is burned within the hardware/firmware, and thus, not changeable by a third party. Further, in one example, the trusted component has an asymmetric key which is signed by the manufacturer of the machine and used in verification.

Client 220 is coupled to host computing system 200 via, e.g., a network 230, such as a wide area network, a local area network, the internet or any other suitable network. Also coupled to network 230 is an authorizing entity 240 that may be used, as described below.

Figure 3:
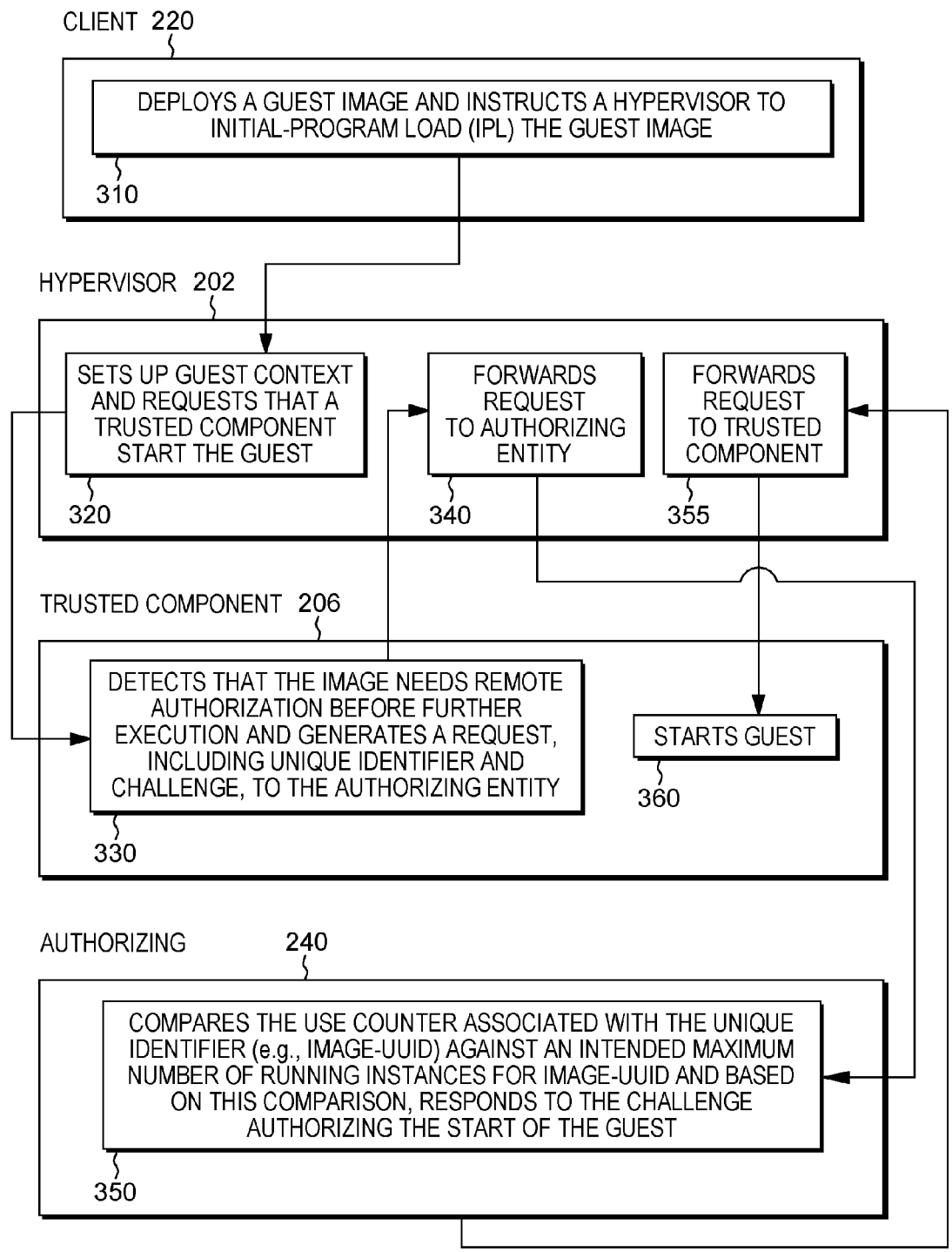
FIG. 3 depicts one example of using the trusted component of FIG. 2 to start a virtual machine, in accordance with an aspect of the present invention.

In one example, it is client 220 that requests that a secure virtual machine be created. One example of this processing is described with reference to FIG. 3. Initially, client 220 deploys a guest image (e.g., virtual machine 204) and instructs hypervisor 202 to initial-program load (IPL) the guest image (310). During deployment of the guest image, the client provides a public key, K_pub, within an encrypted operating system image to be booted. The encrypted operating system image is only accessible in clear text to the trusted component.

Hypervisor 202 sets up a guest context and requests that trusted component 206 start the guest virtual machine (320). Trusted component 206 receives the request, and optionally, detects that the image is to have remote authorization before further execution. (In another embodiment, remote authorization is not performed.) Therefore, it generates a request to be sent to authorizing entity 240 (330). As part of generating the request, trusted component 206 encrypts the request, which includes a unique identifier (e.g., image_uuid) of the guest, a use counter and a unique challenge, described below. The request is encrypted, by trusted component 206, utilizing a key, for example, a communication key (comm_key) obtained, for instance from the initial request received from client 220. An encryption technique (e.g., an Advanced Encryption Standard (AES) or any other know technique) may be used for the encryption. Trusted component 206 generates the request, encrypts it, and forwards it to hypervisor 202.

Hypervisor 202 receives the generated request from trusted component 206 and forwards the request to authorizing entity 240 (340). The authorizing entity compares the use counter associated with the unique identifier against an intended maximum number of running instances for the image_uuid and based on this comparison, responds to the challenge either authorizing or not the start of the guest (350). Authorizing entity 240 encrypts the response using the key (e.g., comm_key), and sends this response to hypervisor 202. Hypervisor 202 forwards the response to trusted component 206 (355).

Provided that the authorizing entity has authorized the guest, the trusted component starts virtual CPUs of the guest (360). During this start of the guest, the trusted component reads the public key, K_pub, in clear text and stores it with guest state information. This guest is secure in that the hypervisor does not have access to its data or context, and therefore, it may be used in public computing environments, including cloud environments.

In another embodiment, the authorizing entity is not used, and the secure virtual machine is created using the client, the hypervisor and the trusted component.

Figure 4:
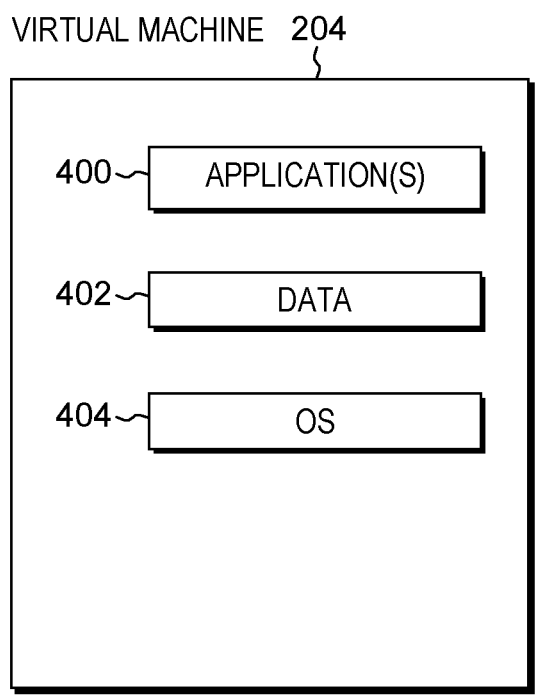
FIG. 4 depicts one example of a virtual machine, in accordance with an aspect of the present invention.

A virtual machine 204, created as described above, may execute and/or store a number of components. For instance, referring to FIG. 4, virtual machine 204 may execute one or more applications 400 (or code), store data 402, and/or optionally, execute an operating system (OS) 404 (also referred to as a guest operating system), as examples. If an error occurs in the virtual machine or to further understand how a particular component (e.g., operating system or application) is working, debugging may be performed within the virtual machine. For example an application or operating system may be debugged. Since, in this environment, the virtual machine is secure, in accordance with an aspect of the present invention, the debugging is also secure in that the hypervisor does not perform the debugging, but instead, the trusted component performs the debugging. The debugging occurs, in one embodiment, in production mode without special support within the guest and without jeopardizing security of the guest before, during and after the debugging.

Figure 5A:
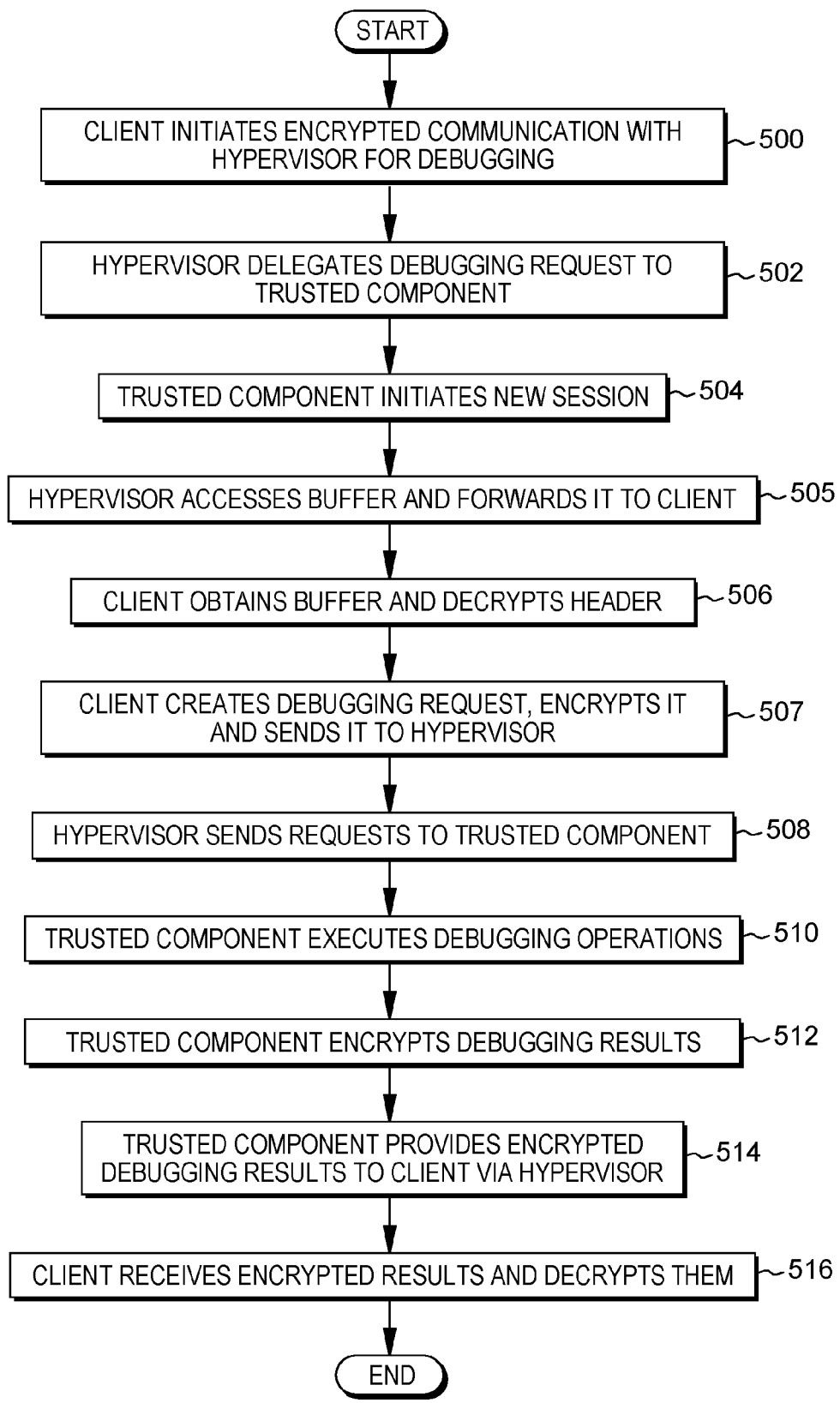
FIGS. 5A-5C depict one example of using a trusted component to perform debugging, in accordance with one or more aspects of the present invention.
Figure 5B:
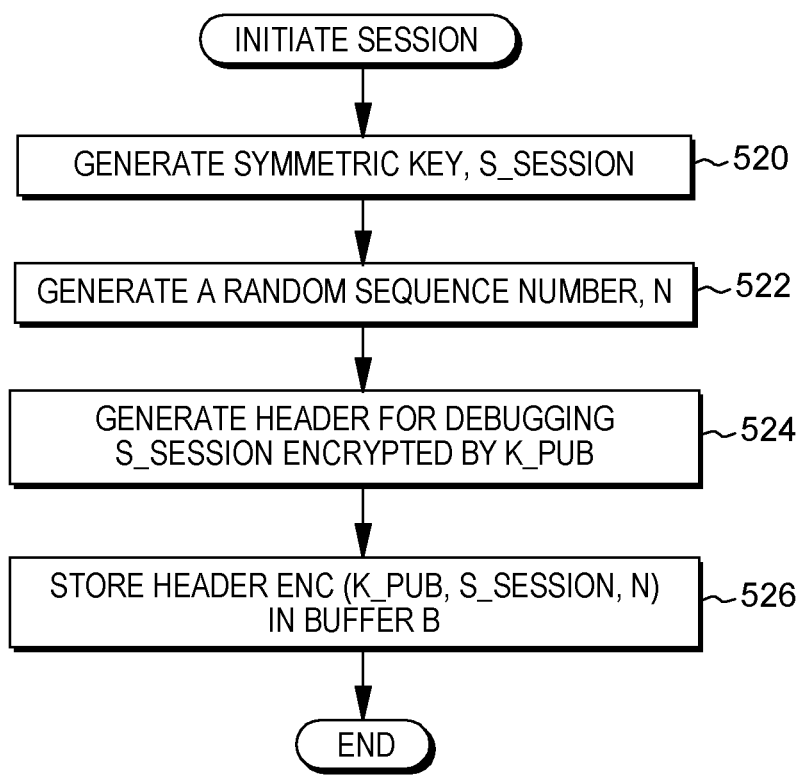
Figure 5C:
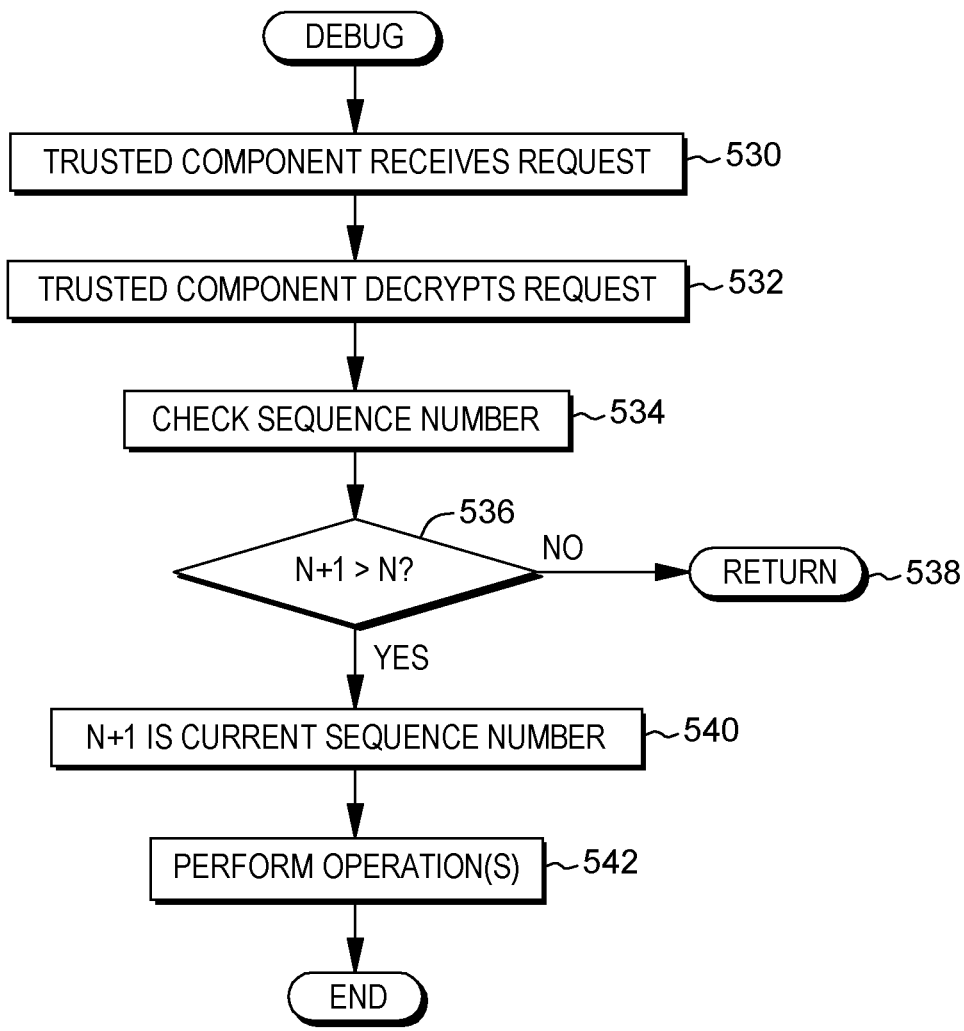

One embodiment of performing debugging in a secure virtual machine is described with reference to FIGS. 5A-5C. Referring initially to FIG. 5A, a client (e.g., client 220) initiates debugging of a virtual machine (e.g., virtual machine 204) by initiating an encrypted communication with a hypervisor (e.g., hypervisor 202) managing the virtual machine, STEP 500. For instance, the client sends a debug request signed with a private key, K_priv, to the hypervisor informing the hypervisor of its intent to debug the guest. The hypervisor receives the request and performs one or more tasks to delegate the debugging request to a trusted component (e.g., trusted component 206) coupled to the hypervisor, STEP 502. For example, the hypervisor uses an interface, called initiate guest debugging, to indicate to the trusted component that debugging is requested and to provide a buffer B for the result.

Based on being informed of the debugging request, the trusted component commences a new session, referred to herein as a session or a debugging session, STEP 504. Further details of one embodiment of initiating a session are described with reference to FIG. 5B. Referring to FIG. 5B, initially, the trusted component generates a symmetric key, S_session, using any known technique (e.g., using stream ciphers or block ciphers), STEP 520. Additionally, the trusted component generates a random sequence number, N, again using any known technique, STEP 522. Moreover, the trusted component generates a header to be used for debugging, which includes S_session encrypted by K_pub, STEP 524. The header enc (K_pub, S_session, N), i.e., the header that includes S_session and N encrypted by K_pub, is stored by the trusted component in buffer B for the hypervisor, STEP 526.

In a further embodiment, S_session and N are encrypted by a negotiated key, rather than K_pub, in which the negotiated key is negotiated between the trusted component and the client.

Returning to FIG. 5A, the hypervisor either receives or otherwise accesses the buffer, and forwards the buffer (i.e., the contents of the buffer) to the client over, e.g., a network (e.g., network 230), STEP 505.

The client obtains (e.g., receives or otherwise accesses) the buffer and based thereon, uses its private key, K_priv, to decrypt the header and obtain S_session and N, STEP 506. Further, the client creates a debugging request, encrypts the request, and sends the encrypted request to the hypervisor, STEP 507. As an example, the client chooses one or more of the following operations, O, to be indicated in the request: read memory at address, write memory at address, read complete register file, write complete register file, set one or more breakpoints, delete one or more breakpoints, etc. Depending on the mode of operation, one or more additional parameters P may be used. For instance, if the selected operation O is Set Breakpoint, a parameter P might be an address, such as 0x10000. As another example, if the selected operation O is write memory, then P could be: address 0x10000, value 0xFEFE, as examples. Many possibilities exist.

Further, a sequence number N+1 is added to the request (e.g., to counter replay attacks). For example, at the beginning of a session, random number N is stored and made available to the client. Then, on each request, the client sends the request with N+1. Thus, each request has its own sequence number, which only the trusted component can compute. Additional padding may also be added to the request to ensure a minimal length. After creating the request, the client encrypts the request with S_session ((N+1)+O+P+padding), using an encryption technique (e.g., AES or any other known technique), and forwards the encrypted request to the hypervisor.

The hypervisor receives the encrypted request and provides (e.g., sends, forwards or otherwise makes available) the request to the trusted component, STEP 508. For instance, the hypervisor uses an interface, called guest debugging, with S_session ((N+1)+O+P+padding) to send the request to the trusted component, along with an additional result buffer B as a parameter.

The trusted component obtains the request and executes the one or more operations included in the request, STEP 510. As an example, referring to FIG. 5C, based on the trusted component receiving the request, STEP 530, the trusted component decrypts the request, i.e., decrypts S_session ((N+1)+O+P+padding) using an encryption technique (e.g., AES or any other known technique), STEP 532, and checks that N+1 is the successor to a local sequence number N, STEP 534. If N+1 is not greater than N, INQUIRY 536, then the call will return to the hypervisor with no data (or fake data), STEP 538. Otherwise, N+1 becomes the current sequence number, STEP 540, and the trusted component performs the requested one or more operations to obtain results, STEP 542. For instance, depending on O and P, the guest memory image/register file will be read/written or a breakpoint is set, etc. If a particular memory location is paged out, a page fault may be presented to the hypervisor. Further, if special hardware is available for debugging purposes, it may be enabled.

Returning to FIG. 5A, the trusted component encrypts the results of the requested operation(s), STEP 512. For instance, the results, together with N+1 and the padding, are encrypted with S_session using an encryption technique (e.g., AES or any other known technique), and the encrypted results are placed in the provided buffer by the trusted component, STEP 512. This buffer is provided to or made available to the hypervisor, which provides (e.g., sends, forwards or otherwise makes available) the buffer with the encrypted results to the client, STEP 514.

The client receives the encrypted results and decrypts them to obtain the results of debugging one or more components within the virtual machine, STEP 516.

By using the trusted component to debug the virtual machine, the security of the virtual machine remains intact. A debug session of a virtual machine, e.g., started by a client initiating a debug communication and ending with receipt by the client of debug results, is controlled by the hypervisor without the hypervisor learning about the contents and state of the virtual machine. The debugging party authenticates itself using a secret that is cryptographically connected with the code to be debugged. For instance, only the creator of the guest boot image is able to embed the public key, K_pub, into the image. Therefore, only the creator is to have access to the private key, K_priv, which is used to decrypt the first data from the trusted component with the session key. In one or more aspects, a communication key is deployed into a container or secure computing environment or trusted component in order to encrypt communications to a remote debugging operator. An interface between the trusted component and the hypervisor is enhanced by means of proxying access during debugging operations and encrypting the results from the trusted component to the hypervisor in order to ensure an untrusted hypervisor does not have any access to that secure data in the container.

Although an example of a computing environment that may incorporate and use one or more aspects of the present invention is described above, other example environments may incorporate and use one or more aspects of the present invention. For example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

In yet further examples, the computing environment may be based on other architectures offered by International Business Machines Corporation and/or other companies.

Aspects of the present invention improve computing technology by improving processing in shared (e.g., public) computing environments. Improving processing in shared computing environments, including distributed environments, such as cloud computing systems, is an issue that is unique to computer technology.

As indicated, one or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
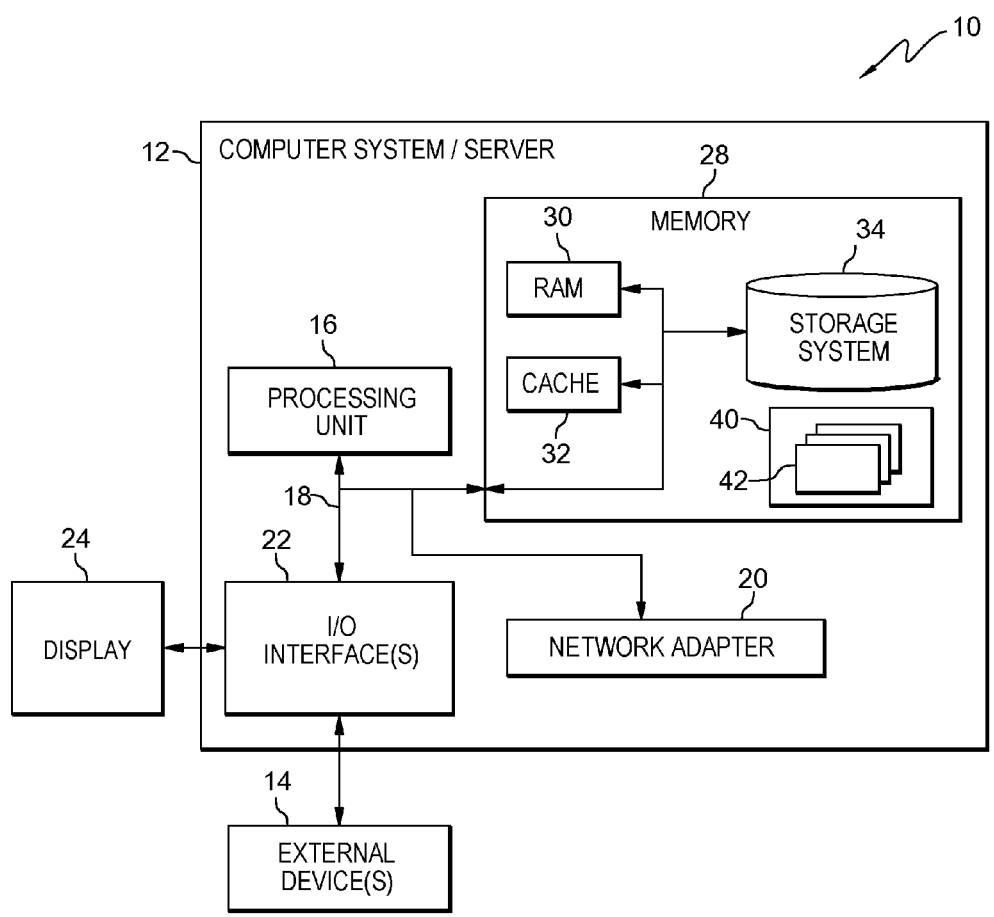
FIG. 6 depicts one embodiment of a cloud computing node.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
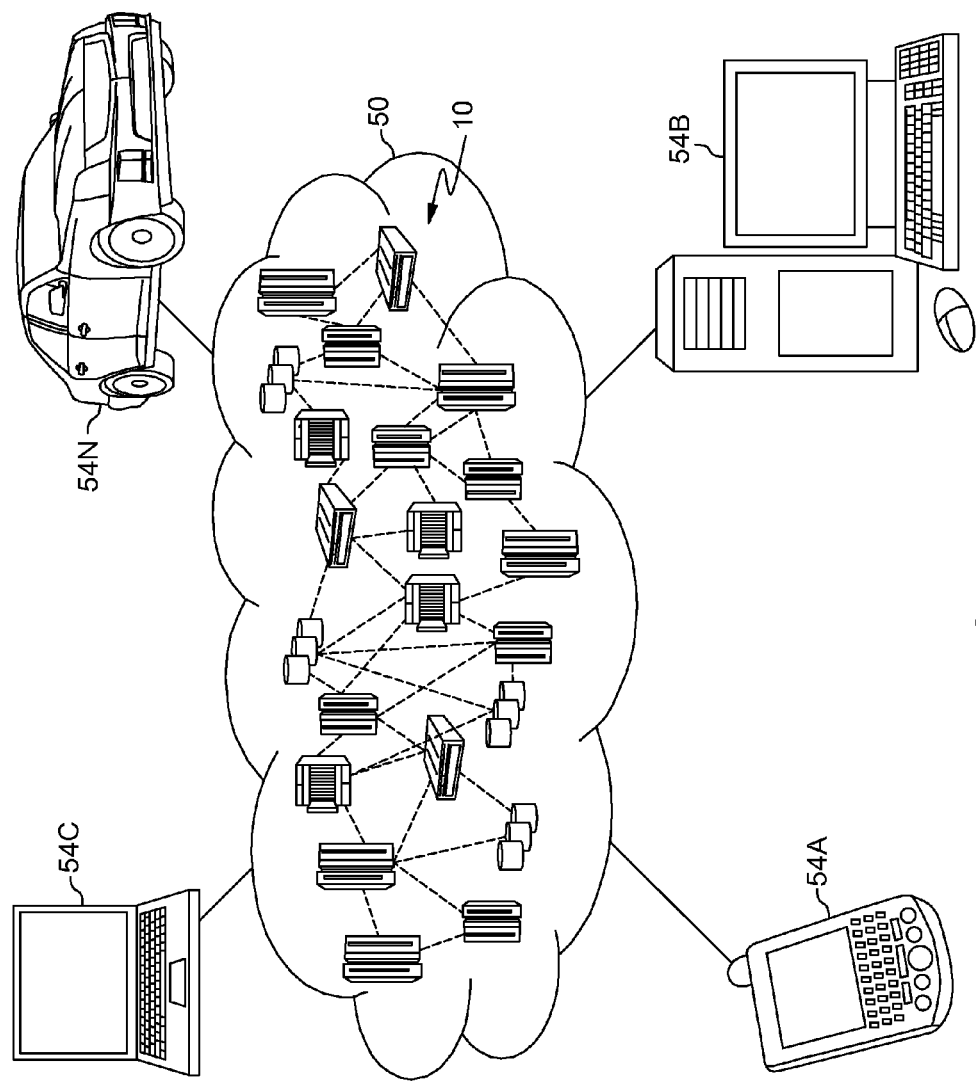
FIG. 7 depicts one embodiment of a cloud computing environment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
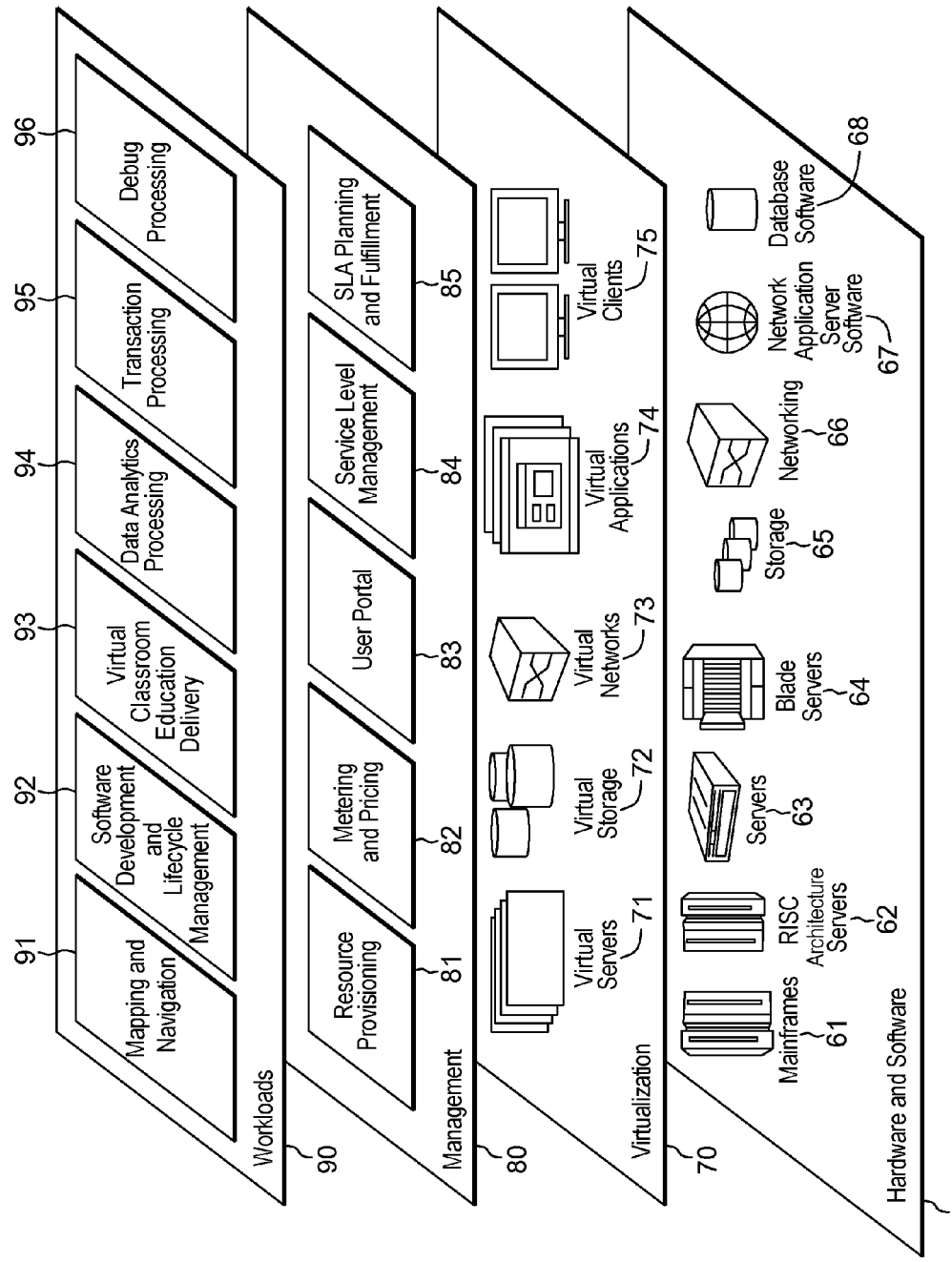
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and debug processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different encryption techniques may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating debugging within a computing environment, the computer program product comprising:
   a computer readable storage device readable by a processing circuit and storing instructions for execution by the processing circuit for performing a method comprising:
      determining, by a trusted component of the computing environment, that debugging of a virtual machine of the computing environment is to be initiated, the determining being based on an encrypted communication inaccessible to a hypervisor, the encrypted communication having been sent by a client via the hypervisor to the trusted component;
      commencing, by the trusted component, a debugging session, based on the determining that debugging of the virtual machine is to be initiated, the commencing the debugging session comprising:
         generating encryption information to be provided to the client for which debugging of the virtual machine is to be performed, the encryption information being inaccessible to the hypervisor and including a symmetric key that is encrypted and to be used by the client to encrypt a debug request to debug the virtual machine; and forwarding the encryption information to the client via the hypervisor;

obtaining, by the trusted component, an encrypted debug request sent by the client via the hypervisor indicating one or more operations to be performed to debug the virtual machine, the encrypted debug request encrypted using the symmetric key;

performing, by the trusted component, the one or more operations specified in the encrypted debug request to obtain debugging results for the virtual machine;

encrypting, by the trusted component, the debugging results using the symmetric key to provide encrypted debugging results;

providing, by the trusted component, the encrypted debugging results to the client via the hypervisor; and wherein encrypting the debugging result using the symmetric key facilitates preventing the hypervisor from accessing data or context of the virtual machine.

2. The computer program product of claim 1, wherein the hypervisor is coupled to the trusted component and manages the virtual machine.

3. The computer program product of claim 1, wherein the generating the encryption information comprises:

generating the symmetric key;

encrypting the symmetric key to provide an encrypted symmetric key; and including the encrypted symmetric key in the encryption information.

4. The computer program product of claim 3, wherein the encryption information further includes a random sequence number generated by the trusted component.

5. The computer program product of claim 4, wherein the commencing the debugging session further comprises storing the encryption information in a buffer, the buffer accessible by the hypervisor, the hypervisor coupled to the trusted component and to the client and managing the virtual machine.

6. The computer program product of claim 5, wherein the obtaining the encrypted debug request is based on the client obtaining the buffer from the hypervisor and creating the encrypted debug request.

7. The computer program product of claim 3, wherein the encrypting the symmetric key to provide the encrypted symmetric key comprises encrypting the symmetric key using a negotiated key, the negotiated key negotiated between the trusted component and the client.

8. The computer program product of claim 1, wherein the method further comprises decrypting, by the trusted component, the encrypted debug request to obtain the one or more operations to be performed.

9. The computer program product of claim 8, wherein the encrypted debug request further includes a sequence number, and wherein the method further comprises:

comparing the sequence number with a current sequence number; and performing the one or more operations based on the comparing indicating the sequence number has a particular relationship with respect to the current sequence number.

10. A computer system for facilitating debugging within a computing environment, the computer system comprising:

a memory; and a processor in communication with the memory, wherein the computer system is configured to perform a method, said method comprising:

determining, by a trusted component of the computing environment, that debugging of a virtual machine of the computing environment is to be initiated, the determining being based on an encrypted communication inaccessible to a hypervisor, the encrypted communication having been sent by a client via the hypervisor to the trusted component;

commencing, by the trusted component, a debugging session, based on the determining that debugging of the virtual machine is to be initiated, the commencing the debugging session comprising:

generating encryption information to be provided to the client for which debugging of the virtual machine is to be performed, the encryption information being inaccessible to the hypervisor and including a symmetric key that is encrypted and to be used by the client to encrypt a debug request to debug the virtual machine; and forwarding the encryption information to the client via the hypervisor;

obtaining, by the trusted component, an encrypted debug request sent by the client via the hypervisor indicating one or more operations to be performed to debug the virtual machine, the encrypted debug request encrypted using the symmetric key;

performing, by the trusted component, the one or more operations specified in the encrypted debug request to obtain debugging results for the virtual machine;

encrypting, by the trusted component, the debugging results using the symmetric key to provide encrypted debugging results;

providing, by the trusted component, the encrypted debugging results to the client via the hypervisor; and wherein encrypting the debugging result using the symmetric key facilitates preventing the hypervisor from accessing data or context of the virtual machine.

11. The computer system of claim 10, wherein the generating the encryption information comprises:

generating the symmetric key;

encrypting the symmetric key to provide an encrypted symmetric key; and including the encrypted symmetric key in the encryption information.

12. The computer system of claim 10, wherein the method further comprises decrypting, by the trusted component, the encrypted debug request to obtain the one or more operations to be performed.

13. A computer-implemented method of facilitating debugging within a computing environment, the computer-implemented method comprising:

determining, by a trusted component of the computing environment, that debugging of a virtual machine of the computing environment is to be initiated, the determining being based on an encrypted communication inaccessible to a hypervisor, the encrypted communication having been sent by a client via the hypervisor to the trusted component;

commencing, by the trusted component, a debugging session, based on the determining that debugging of the virtual machine is to be initiated, the commencing the debugging session comprising:

generating encryption information to be provided to the client for which debugging of the virtual machine is to be performed, the encryption information being inaccessible to the hypervisor and including a symmetric key that is encrypted and to be used by the client to encrypt a debug request to debug the virtual machine; and forwarding the encryption information to the client via the hypervisor;

obtaining, by the trusted component, an encrypted debug request sent by the client via the hypervisor indicating one or more operations to be performed to debug the virtual machine, the encrypted debug request encrypted using the symmetric key;

performing, by the trusted component, the one or more operations specified in the encrypted debug request to obtain debugging results for the virtual machine;

encrypting, by the trusted component, the debugging results using the symmetric key to provide encrypted debugging results;

providing, by the trusted component, the encrypted debugging results to the client via the hypervisor; and wherein encrypting the debugging result using the symmetric key facilitates preventing the hypervisor from accessing data or context of the virtual machine.

14. The computer-implemented method of claim 13, wherein the generating the encryption information comprises:

generating the symmetric key;

encrypting the symmetric key to provide an encrypted symmetric key; and including the encrypted symmetric key in the encryption information.

15. The computer-implemented method of claim 13, further comprising decrypting, by the trusted component, the encrypted debug request to obtain the one or more operations to be performed.

16. The computer-implemented method of claim 15, wherein the encrypted debug request further includes a sequence number, and further comprising:

comparing the sequence number with a current sequence number; and performing the one or more operations based on the comparing indicating the sequence number has a particular relationship with respect to the current sequence number.

* * * * *